Oct. 4, 1966　　　　C. W. KLOSTERMANN　　　　3,277,426
CABLE CONNECTORS AND METHODS FOR THE MANUFACTURE THEREOF
Filed April 30, 1964　　　　　　　　　　　　　　　　2 Sheets-Sheet 1

INVENTOR.
CURT W. KLOSTERMANN, DECEASED,
BY IRENE KLOSTERMANN WEISS, ADMINISTRATOR
BY
*L. F. Hammand.*
ATTORNEY

United States Patent Office 3,277,426
Patented Oct. 4, 1966

3,277,426
CABLE CONNECTORS AND METHODS FOR THE MANUFACTURE THEREOF
Curt W. Klostermann, deceased, late of Chicago, Ill., by Irene Klostermann Weiss, administrator, Chicago, Ill., assignor to Amphenol Corporation, a corporation of Delaware
Filed Apr. 30, 1964, Ser. No. 364,029
10 Claims. (Cl. 339—192)

This invention relates to electrical connectors and methods of manufacture thereof and more particularly to multiple circuit connectors for use at the terminal ends of telephone cables or the like and to an improved method for the construction of such connectors. Although discussed herein primarily in connection with telephone cable installations, the invention is obviously of more general utility, as will be seen.

It is a common practice in equipping new construction with telephone service or in altering the telephone service in an existing structure to extend multiple conductor cables through conduits previously installed in the structure. The ends of the cable are generally terminated in connection plug assemblies. Oftentimes the cut end of the cable is snaked through the conduit and the terminal plug is applied to the cable and connected to each of the conducting strands of the cable after its emergence from the end of the conduit. Occasionally, when the size of the conduit is sufficiently large, the terminal plug may be applied to the end of the cable first and thereafter pulled through the conduit. This latter approach is capable of providing certain economies permitting the manufacture and assembly of the cable connector on the end of the cable at the factory where there is less chance of error, where mistakes in connection of the separate conductors to the terminal contact can be more easily detected and remedied, and where connections can be made in greater volume and with greater ease than in the field.

Unfortunately there are frequently offsetting economic factors which do not commend the affixation of the terminal connection assembly to the multiple conductor before its installation in a conduit. For example, to allow the passage therethrough of a cable with an end connector installed thereon, a conduit must of course be of larger diameter than it need be to allow the passage of the cable without such an end connector thereon. In a new structure the additional expense of larger diameter conduit may not be economically justifiable solely on the basis of the greater ease of inserting preassembled multiple conductor cables with cable connectors therethrough. Of course, in an existing structure where new conductor cables for telephone service or the like are being installed, there is often no economical alternative to the use of the conduits already in the structure, regardless of the internal diameter of the conduit. Consequently, in either new or existing structures telephone conduits are not usually over generous in size.

End connectors for multiple conductor telephone cables and the like must possess a very high degree of reliability. The large number of conductors in a typical telephone cable naturally necessitates that an end connector affixed to the cable be capable of establishing electrical continuity through a large number of separate circuits simultaneously. The importance of reliability in completion of the separate circuits through the end connector is underscored by the difficulty of tracing any circuit interruption to its source and of correcting the discontinuity among a large number of closely spaced connector contacts. Therefore, a cable connecting assembly which is assembled on a multiple conductor cable before its installation and which is subsequently snaked through a conduit must be capable not only of accepting the abuse of being dragged through the narrow diameter of a lengthy conduit and around bends of small radii, but also of surviving the passage therethrough in an undamaged condition to complete each of the circuits extending therethrough with a low impedance and with a high degree of reliability.

It is a general object of this invention to provide multiple contact cable connectors of such design and construction that they may be substantially smaller and more compact than prior connectors to permit their passage through conduits of small diameters and yet to achieve this result without sacrifice of ruggedness or dependability.

The successful accomplishment of this objective naturally involves serious problems of mechanical and electrical design, and it is accordingly among the principal objects of the invention to reconcile the conflicting mechanical and electrical requirements imposed on multiple conductor cable connectors in a manner to achieve the desired results.

It is another object of the present invention to provide an electrical connector for multiple conductor telephone cables or the like having contact members as well as the mounting elements therefore of such design and construction as to permit the use of a comparatively large number of mating contacts in very closely grouped relation with minimal external dimensions, yet with the coacting parts of the connector designed and constructed in a manner to achieve positive, rugged, low resistance electrical unions between mating contacts without sacrifice of essential mechanical characteristics.

It is a still further object of this invention to provide a connector arrangement for flexible multiple conductor cables especially adapted to improve the ease of connection of rugged end contacts to the relatively soft and flexible conductors of the cable.

Yet another object of the invention is the provision of a novel method of constructing and assembling end connectors on multiple conductor cables to improve the ease of installation of the cables in and through conduits of relatively small diameter and the affixation of the end contact arrangement thereto.

The objects of this invention are accomplished by the unique arrangements of contact and mountings described in the following disclosure from which it will be apparent that the separate conductors of the cable itself are employed as end contacts in an intermediate connector of unusually small configuration. The intermediate connector, made integral with the cable, holds the ends of the conductors in a fixed orientation neatly spaced from one another, carefully shielding the conductors from dislocation or damage during the passage of the cable through the conduit. After the cable and its integral intermediate connector are snaked through a conduit in a particular installation, a more generously proportioned terminal connector having rugged terminal contacts capable of repeated connection and disconnection is installed on the intermediate connector with the terminal contacts of the terminal connector in plug-in engagement with the relatively soft and flexible intermediate connector contacts formed by the cable conductors themselves.

Although the scope of the invention is not to be limited except by the claims appended hereto, further details of the invention as well as additional objects and advantages are more completely expressed in the following detailed description taken together with the accompanying drawings in which:

Figure 1:
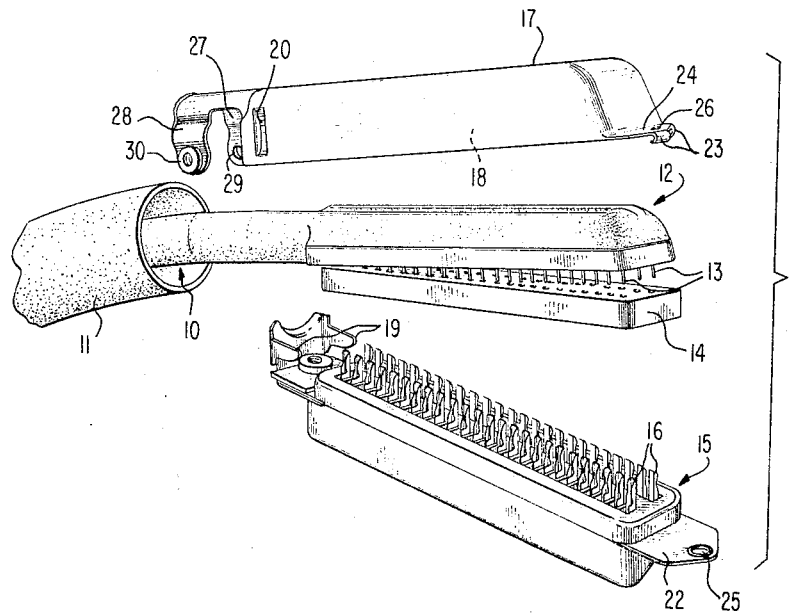
FIGURE 1 is a partially exploded perspective view of a multiple conductor cable extending through the end of a conduit and terminating in a cable connector assembly according to the present invention.

In the exploded view of FIGURE 1 can be seen the various subcombinations which make up and end connector assembly constructed according to this invention. These subcombinations include a sheathed multiple conductor cable 10 extending through a metallic conduit 11 having a relatively small internal diameter. The cable 10 comes to an end at an integral intermediate connector assembly 12 having, in this embodiment of the invention, two rows of intermediate contacts 13 which, as will be seen, are formed by the relatively flexible ends of the cable conductors themselves. An insulating contact guard 14 fits over and about the intermediate contacts 13 to protect them against dislocation or injury during the passage of the intermediate connector 12 and the cable 10 through the conduit 11 and after the emergence of the end of the cable from the conduit. The contact guard 14, which is normally attached to the intermediate contact assembly 12 as a part thereof, has openings extending therethrough to permit access to the internal contacts 13 as described more fully hereinafter.

The contacts 13 of the intermediate connector assembly, being formed of the cable conductors themselves, are not intended for repeated connection to or disconnection from equipment serviced by the cable 10. For this purpose a terminal plug assembly 15 is provided having two rows of plug-in contacts 16 for mating engagement with the intermediate contacts 13. The terminal plug assembly 15 is intended to be affixed once and only once to the intermediate connector 12 and to be fastened thereon. In this it is assisted by a cover member 17 which extends over the top part of the intermediate connector 12 and is clamped to the terminal plug assembly 15.

The cover 17, it can be seen, includes a recess 18 which nests over and houses the top portion of intermediate connector 12. Firm interconnection between the cover portion 17 and the terminal plug 15 is accomplished in part by a locking engagement between the longitudinally extending arms 19 at one end of the terminal plug assembly 15 and the brackets 20 formed by inwardly offsetting portions of the cover 17. The forward ends of the cover member 17 and terminal plug assembly 15 are secured by an engagement between the spade-shaped flange 22 on the terminal plug 15 and the overturned lip portions 23 formed by reverse bending a section of the flange 24 on the forward end of cover section 17.

After attachment together the cover section 17 and the plug in connector 15 may be secured permanently by a screw inserted through the aperture 25 in flange 22 and threaded into aperture 26 in flange 24. The split collar formed by arms 27 and 28 depending at the rear of cover member 17 may then be tightened about cable 10 by a screw fastener inserted through aperture 29 in arm 27 and received in threaded engagement with an internally threaded nut 30 fastened to arm 28.

Before turning attention to the internal construction of the separate portions of the intermediate connector 12 and the terminal plug 15, it is to be noted that the dimensions of the intermediate connector 12 are sufficiently small as to permit its passage with the cable 10 through the internal diameter of the conduit 11. Terminal plug 15, however, together with the cover member 17 are required to be of more rugged construction and therefore possess larger overall dimensions which would prevent their passage through the interior of conduit 11.

The larger and more rugged construction of the terminal plug assembly 15 is a result of the requirements typically imposed on such a connector that it be sufficiently rugged to endure repeated connection, disconnection, and reconnection to equipment serviced by the line 10 for the purposes of testing, repair, and alteration of portions of the electrical system. In a typical telephone installation in an office building, for example, it may be necessary many times during the life of the building to reroute telephone service, to add additional service, or to test for and correct faults which may arise in the equipment. Consequently, it is necessary to have a readily disconnectible plug-in connection provided, in this case, by the terminal plug 15, whose details are described more completely below. Once the terminal plug 15 is affixed to the intermediate connector 12 with contacts 16 in firm engagement with the intermediate contacts 13, however, it is not necessary thereafter to disturb the engagement between contacts 13 and 16. Nevertheless, during the installation of the multiple conductor cable 10, the terminal plug 15 may be mated with the intermediate connector 12 without the necessity of making soldered connections on the spot or of determining which of the separate conductors in cable 10 are to be connected to the respective terminals 16 of the terminal plug 15. This assembly may be accomplished on the spot without regard to the general environmental conditions at the time of installation, whether the temperature is very warm or numbing cold, and without reliance either upon special skills of the person accomplishing the final assembly or upon his familiarity with the telephone system or other electrical equipment under installation.

Figure 2:
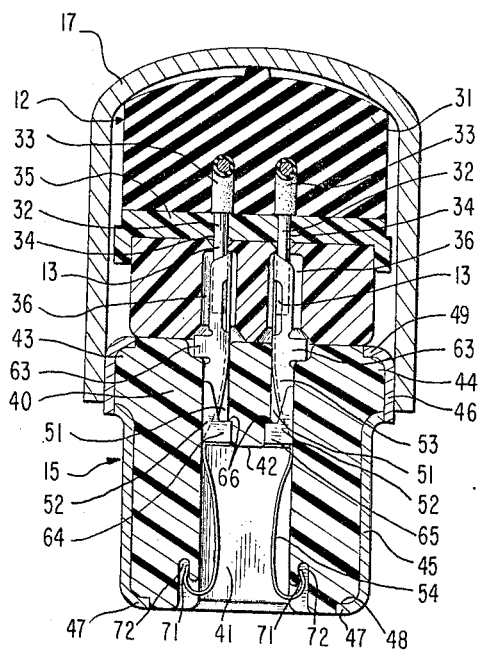
FIGURE 2 is a transverse cross-sectional view through the center of the end connector arrangement when fully assembled.

Turning attention now to the lateral cross-sectional view of FIGURE 2, the internal details of the mating intermediate connector assembly 12 and the terminal plug assembly 15 may be seen. Herein, the internal connector plug is shown to comprise a block-like matrix 31 preferably formed of a rubbery potting compound through which extend tthe separate conductors 32 of the multiple conductor cable in two longitudinally extending rows, only two of the conductors being shown in this cross-sectional view. These conductors 32 are each covered by a layer 33 of installation except at their extreme ends where the insulation layers 33 are stripped back to allow the emergence of the conductors 32 through apertures 34 in an elongated narrow conductor positioning plate 35 formed of a relatively rigid dielectric material. The stripped conductors 32 extend through and beyond the conductor positioning plate 35 and into socket-like recesses 36 formed in the insulating terminal guard 14.

The cover member 17 forms a hood which encompasses the intermediate connector 12 above and on opposite sides, but which is open on the bottom to permit co-operative telescopic insertion of the terminal plug assembly 15. The terminal plug assembly 15 comprises a dielectric insert 40 having a deep central longitudinal channel 41 bottomed at 42 and adapted to receive a mating plug not shown in the illustration. The mating plug may have a configuration such as is described in U.S. Patent 3,002,176 issued to R. S. Yopp on September 26, 1961. Marginal shoulders 43 and 44 extend around the back of the dielectric insert 40 and are enclosed within a sheet metal shell consisting of a forward housing 45 and a back cap 46. The forward housing 45 closely surrounds the forward portion of the dielectric with an inwardly projecting front flange 47 on the housing engaging a marginal shoulder 48 at the forward end of the insert. The back cap 46 encloses the opposite portion of the insert 40 with an additional inwardly projecting flange 49 in closely interfitting relationship with the shoulders 43 and 44. The forward housing 45 and back cap 46 are provided at opposite ends with extending mounting flanges pierced and eyeletted together as seen, for example, at 25 in FIGURE 1, to form a permanent undetachable metal shell around the dielectric insert 40.

Pairs of contact cavities 51 extend through the dielectric insert 40 into communication with the channel 41 to contain double-ended terminal contact members 52 therein. Each of the individual terminal contact members 52 consists of a single integral stamping of relatively thin sheet metal. In a preferred embodiment of the invention these contacts are formed of cadmium bronze .006 inch in thickness, with the entire contact member gold plated over silver. The contact members 52 as seen in FIGURE 2 comprise an upper shank portion 53 having a three-sided channel-shaped configuration and a ribbon-like lower portion 54.

Figure 3:
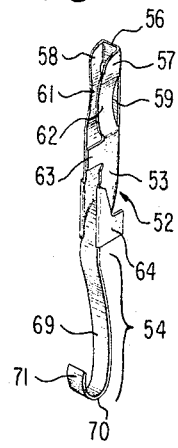
FIGURE 3 is a detailed perspective view of a portion of an internal contact element illustrated in FIGURE 2.

As can be seen more clearly in the detailed view of FIGURE 3, the shank portion 53 includes a central longitudinal web 56 and a pair of side flanges 57 and 58. The shank portion 53 is slit on opposite sides at 59 to allow the indention inwardly of opposing portions of the side flanges 57 and 58 as seen at 61 and 62 respectively. These indentations 61 and 62 provide a resilient connector portion of shank 53 to mate frictionally with the intermediate terminals 13 of the intermediate connector 12, as illustrated in FIGURE 2. The shank portion 53 of the contact members 52 also includes a locking tab 63 which may be bent outwardly after the terminal contacts 52 are inserted into the dielectric to hold the individual contact members 52 against reverse displacement. Side flanges 64 and 65 at the lowermost extremity of the shank portion 53 abut against shoulders 66 of the contact cavities 51 when the shank 53 of each of the contact member 52 is forced into its respective cavity.

The lower blade portion 54 of the contact member is constituted by a single narrow ribbon of the sheet metal stock, precisely formed to include a convex face portion 69 and a return or horseshoe bend 70 terminating in a rocker end 71 seated within pocket 72 of the dielectric insert 37 as described in the aforementioned U.S. Patent 3,002,176. The blade portions 54 of the contact members 52 are ruggedly resilient to provide plug-in contacts which may be repeatedly connected to and disconnected from a plug of mating configuration as aforesaid. When terminal plug 15 is joined to the intermediate connector 12 and fastened to the housing 17, the external appearance of the entire assembly is very similar to telephone cable connecting assemblies which have been in use heretofore. The described assembly is, in fact, perfectly compatible with prior telephone cable connectors, and for this reason, the practice of this invention does not require extensive replacement of existing connectors in a particular system.

Figure 4:
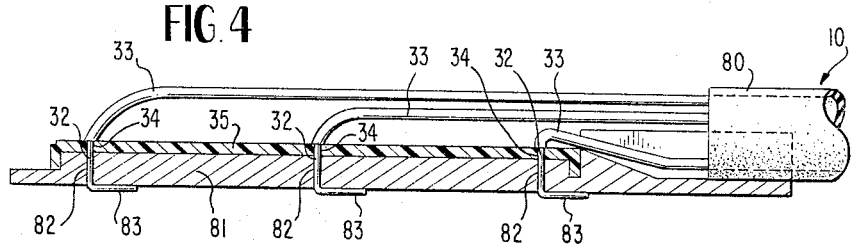
FIGURE 4 is a longitudinal cross-sectional view of a multiple conductor cable end connection arrangement according to this invention at an initial stage in its manufacture.

In FIGURE 4 is illustrated an initial stage in the preparation of the intermediate connector assembly in accordance with the practice of this invention. First, the protective sheath 80 of the multiple conductor cable 10 is cut back to expose the insulated conductors therein. Although the illustration is of a typical fifty-conductor telephone cable, only three of the conductors are shown for clarity and simplicity of presentation. The layer of insulation 33 on each conductor is trimmed to expose a length of the conductors 32 although, as will be seen, the exact extent to which the insulation layers are trimmed back is not critical. The elongated conductor positioning plate 35 which is to form a portion of the intermediate connector assembly is placed upon a shear plate 81 having apertures 82 in registry with the apertures 34 in the conductor positioning plate 35. The exposed conductors 32 are then inserted through the apertures 34 in the conductor positioning plate 35, which is oriented generally parallel to the length of the cable 10, and the conductors are pulled through until the insulative layer 33 on each conductor abuts the upper surface of the positioning plate 35. The conductors 32, which then extend through and beyond the opposite lower surface of the shear plate 81, may be bent back against the bottom of the shear plate at 83 to maintain the abutment between the insulative layers 33 and the upper surface of the conductor positioning plate 35.

Figure 5:
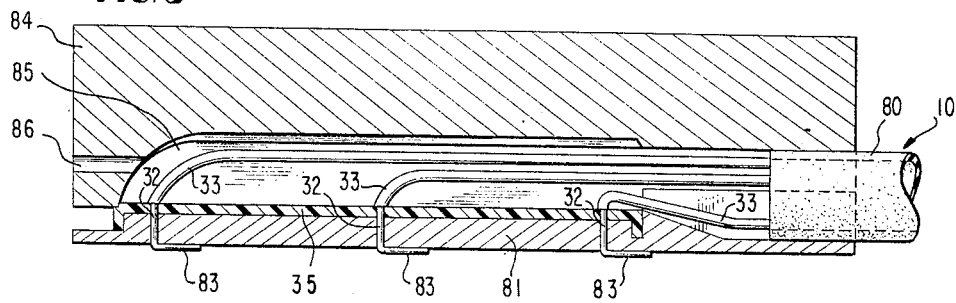
FIGURES 5, 6 and 7 are views similar to FIGURE 4 illustrating progressively succeeding stages in the manufacture of the end connector assembly.

Thereafter, as seen in FIGURE 5, a potting mold 84 having a hollow recess 85 is placed over the shear plate and clamped temporarily to the structure with the recess 85 covering the conductor positioning plate 35. The potting mold 84 should be carefully fitted to the insulative sheath 80 of the cable 10 and to the conductor positioning plate 35 to minimize the possibility of leakage of the potting compound in the succeeding operation. A potting compound, preferably of a tough rubbery material, is then injected through one or more orifices 86 into the internal recess 85 to form a rigid unitary assembly integral with the sheath 80 of the cable and with the conductor positioning plate 35, thereby completely encapsulating the insulated conductors up to the points of their passage through the insulating spacer block 35.

Figure 6:
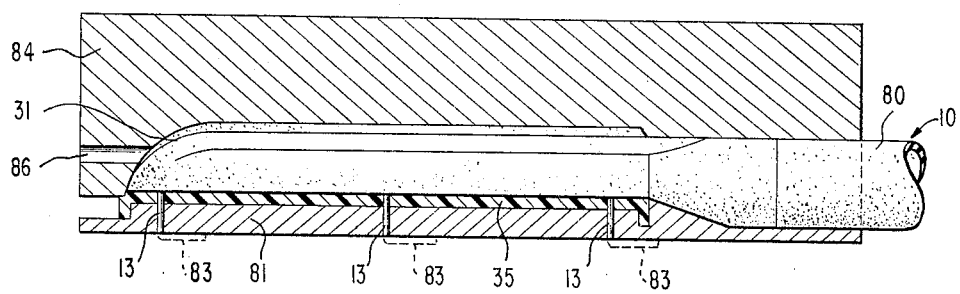

This creates the matrix 31 of the potting compound which may be seen in FIGURE 6, wherein the assembly is illustrated after the potting compound has been introduced into the potting mold. Thereafter the potting mold 84 may be removed and the bent ends 83 of the conductors 32 may be trimmed to an equal length by shearing the conductors at the point of their emergence from the bottom of the shear block 81. This results in the ends of the conductors 32 being generally perpendicular to the longitudinal dimension of cable 10 and equal in length to form the intermediate connectors 13.

Figure 7:
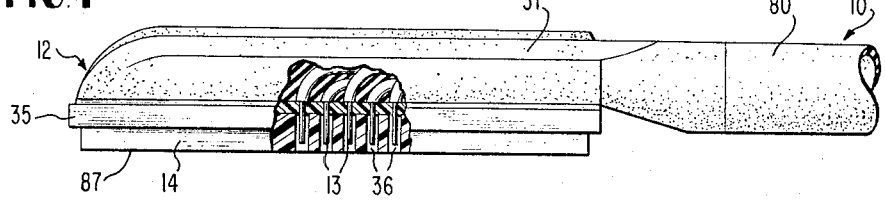

As seen in FIGURE 7, the shear block 81 is then removed and the contact guard 14 is inserted in its place and cemented to the face of the positioning plate 35. The socket-like apertures 36 in the contact guard 14 as seen in the cut-away portion of the intermediate connector 12, permit access to the intermediate contacts 13 from beneath the assembly as seen in this illustration. This, of course, is the intermediate connector subassembly 12 which is intended to be inserted through a conduit. After the assembly of the intermediate connector a strip of adhesive tape may be applied temporarily to the exposed face 87 of the terminal guard 14 to protect the intermediate connectors 13 and the apertures 36 in which they are situated from collecting dirt particles during the passage through a conduit.

Typical end connector assemblies in use heretofore on fifty-conductor telephone cables, if preinstalled on a cable and passed through a conduit, have required that the conduit be at least 1⅛ inch in internal diameter. The intermediate connector described herein, on the other hand, when applied to the same basic type of multiple conductor cable, can be pulled through lengthy conduits having an internal diameter as little as ¾ inch and are capable of being passed through shorter holes as small as ⅝ inch in diameter.

From the foregoing, it will be evident that the present invention accomplishes its objectives by the provision of a unique connector assembly for a multiple conductor cable in which the conductors of the cable are themselves employed as plug-in intermediate contacts. The result of these teachings is a marked improvement in the assembly and installation of multiple conductor electrical equipment permitting a greater facility in the installation of cable connecting assemblies and with a greater resulting reliability in the electrical connections made thereby.

While but one preferred embodiment of the invention has been shown and described herein, it should be understood that this embodiment is intended to be illustrative and not necessarily limiting on the scope of the invention. Since certain variations will doubtless occur to those making use of these teachings the appended claims are intended to cover all such variations as fall within the true spirit and scope of the invention in its broader aspects.

What is claimed is:

1. In combination:
   a multiple conductor cable having a plurality of mutually insulated electrical conductors extending the length thereof;
   an intermediate connector attached to one end of said cable comprising a body portion of insulative material spacing the ends of said conductors apart, the ends of said conductors being stripped of insulation and extending through and beyond said body portion to form intermediate plug-in contacts; and
   a terminal plug attached to said intermediate connector and having a plurality of spaced-apart double-ended terminal contacts frictionally engageable at one end with said intermediate contacts and at the other end with contacts of a mating plug, said one end of each terminal contact having a channel-shaped configuration including a web portion and opposed side walls with portions of said opposed side walls inwardly offset for resilient frictional engagement with said intermediate contacts.

2. In combination:
   a multiple conductor cable having
   a plurality of insulated electrical conductors extending lengthwise thereof;
   an intermediate connector integral with one end of said cable including
   an elongated narrow conductor positioning member of dielectric material having a plurality of conductor-receiving apertures therein, said conductor positioning member being aligned generally parallel to the length of said cable at said one end with the ends of said conductors stripped of insulation and projecting through and beyond said conductor-receiving apertures in directions generally perpendicular to the cable length to form intermediate contacts,
   a matrix of molded material bonded to said cable and to said conductor positioning member on the side opposite said intermediate contacts in encapsulating relationship to said insulated conductors, and
   a contact guard of relatively rigid insulating material affixed to said conductor positioning member to surround said intermediate contacts, said contact guard exposing said intermediate terminals for plug-in access from the side opposite said conductor positioning member.

3. In combination:
   a multiple conductor cable having
   a plurality of insulated electrical conductors extending lengthwise thereof;
   an intermediate connector integral with one end of said cable including
   an elongated narrow conductor positioning body of insulative material aligned generally parallel to the length of said cable at said one end with the ends of said conductors projecting through said conductor positioning body in directions generally perpendicular to the cable length to form intermediate contacts; and
   a terminal plug attachable to said intermediate connector and having
   an insulating body portion with contact-receiving apertures therein,
   double-ended terminal contacts positioned in the apertures of said body portion, each of said terminal contacts having an intermediate connector portion frictionally engageable with the intermediate contacts of said intermediate connector and a terminal portion frictionally engageable with a mating plug,
   said intermediate connector portion having a channel-shaped configuration including a web portion and opposed side walls with portions of said opposed side walls inwardly offset for resilient frictional engagement with said intermediate contacts.

4. In combination:
   a multiple conductor cable having
   a plurality of electrical conductors extending lengthwise of said cable,
   a layer of insulation on each of said conductors, and
   a protective sheath covering said insulated conductors;
   an intermediate connector integral with one end of said cable including
   an elongated narrow conductor positioning member of dielectric material having a plurality of conductor-receiving apertures therein, said conductor positioning member being aligned generally parallel to the length of said cable at said end with the ends of said conductors projecting through and beyond said conductor-receiving apertures in directions generally perpendicular to the cable length to form intermediate contacts.
   a matrix of molded material bonded to said cable and to said conductor positioning member on the side opposite said intermediate contacts in encapsulating relationship to said insulated conductors,
   a terminal plug attachable to said intermediate connector and having
   an insulating body portion with contact-receiving apertures therein,
   double-ended terminal contacts positioned in the apertures of said body-portion, each of said terminal contacts having an intermediate connector portion frictionally engageable with the intermediate contacts of said intermediate connector and a terminal portion frictionally engageable with a mating plug.

5. In combination:
   a multiple conductor cable having
   a plurality of electrical conductors extending lengthwise of said cable,
   a layer of insulation on each of said conductors, and
   a protective sheath covering said insulated conductors;
   an intermediate connector integral with one end of said cable including
   an elongated narrow conductor positioning member of dielectric material having a plurality of conductor-receiving apertures therein, said conductor positioning member being aligned generally parallel to the length of said cable at said end with the ends of said conductors stripped of insulation and projecting through and beyond said conductor-receiving apertures to form intermediate contacts,
   a matrix of molded material bonded to said cable and to said conductor positioning member on the side opposite said intermediate contacts in encapsulating relationship to said insulated conductors,
   a contact guard of relatively rigid insulating material affixed to said conductor positioning member to surround and protect said intermediate contacts, said contact guard exposing said intermediate terminals for access from the side opposite said conductor positioning member;
   a terminal plug attachable to said intermediate connector and having
   an insulating body portion with contact-receiving apertures therein,
   double-ended terminal contacts positioned in the apertures of said body portion, each of said terminal contacts having an intermediate connector portion frictionally engageable with the intermediate contacts of said intermediate connector and a terminal portion frictionally engageable with a mating plug, said intermediate connector portion having a channel-shaped configuration including a web portion and opposed side walls with portions of said opposed side walls inwardly offset for resilient frictional engagement with said intermediate contacts.

6. In combination:
a multiple conductor cable having
a plurality of electrical conductors extending lengthwise of said cable.
a layer of insulation on each of said conductors, and
a protective sheath covering said insulated conductors;
an intermediate connector integral with one end of said cable including
an elongated narrow conductor positioning plate of dielectric material having a plurality of conductor-receiving apertures therein, said conductor positioning plate being aligned generally parallel to the length of said cable at said one end with the ends of said conductors stripped of insulation and projecting through and beyond said conductor-receiving apertures in directions generally perpendicular to the cable length to form intermediate contacts,
a matrix of molded material bonded to said cable and to said conductor positioning plate on the side opposite said intermediate contacts in encapsulating relationship to said insulated conductors, and
a contact guard of relatively rigid insulating material affixed to said conductor positioning plate to surround and protect said intermediate contacts, said contact guard exposing said intermediate terminals for access from the side opposite said conductor positioning plate; and
a terminal plug attachable to said intermediate connector and having
an insulating body portion with contact-receiving apertures therein, and
double-ended terminal contacts positioned in the apertures of said body portion, each of said terminal contacts having an intermediate connector portion frictionally engageable with the intermediate contacts of said intermediate connector and a terminal portion frictionally engageable with a mating plug,
said intermediate connector portion having a channel-shaped configuration including a web portion and opposed side walls with portions of said opposed side walls inwardly offset for resilient frictional engagement with said intermediate contacts.

7. The method of preparing and installing a flexible cable having
a plurality of insulated electrical conductors extending lengthwise thereof
removing the insulation from the ends of the conductors to bare the conductors,
encapsulating the insulated conductors near their ends in a matrix of moldable material while holding said uninsulated ends in precisely spaced apart relationship to form an intermediate connector integral with the end of the cable having intermediate plug-in terminals constituted by the cable conductors themselves,
inserting the cable and its intermediate connector through a conduit until the intermediate connector emerges from the opposite end of the conduit, and thereafter
fastening to the intermediate connector a terminal plug having terminal elements in plug-in frictional engagement with the intermediate plug-in terminals of the intermediate connector.

8. The method of preparing and installing a flexible cable having a plurality of insulated electrical conductors extending lengthwise thereof
removing the insulation from the ends of the conductors to bare the conductors,
inserting the uninsulated ends of said conductors through apertures in a dielectric member to hold said uninsulated ends in precisely spaced-apart relationship,
encapsulating the insulated ends of said conductors in a matrix of moldable material applied to the side of the dielectric member abutted by the insulation on the conductors to form an intermediate connector integral with the end of the cable having intermediate plug-in terminals constituted by the bare ends of the cable conductors themselves,
inserting the cable and its intermediate connector through a conduit until the intermediate connector emerges from the opposite end of the conduit, and thereafter
fastening to the intermediate connector a terminal plug having terminal elements in plug-in frictional engagement with the intermediate plug-in terminals thereof.

9. The method of preparing a flexible cable having
a plurality of electrical conductors extending lengthwise of said cable,
a layer of insulation on each of said conductors, and
a protective sheath covering said insulated conductors; which comprises:
stripping the protective sheath at one end of said cable to expose the insulated conductors therein,
removing the insulation from the ends of the conductors to bare the conductors,
inserting the uninsulated ends of said conductors through apertures in a dielectric member to hold said uninsulated ends in precisely spaced-apart relationship generally perpendicular to the length of the cable at the end thereof with the insulation on said conductors abutting said dielectric member on one side thereof,
encapsulating the insulated ends of said conductors in a matrix of moldable material applied to the side of the dielectric member abutted by the insulation on the conductors to form an intermediate connector integral with the end of the cable having intermediate plug-in terminals constituted by the cable conductors themselves,
installing the multiple conductor cable in a structure by inserting the cable and its intermediate connector through a conduit until the intermediate connector emerges from the opposite end of the conduit, and thereafter
fastening to the intermediate connector a terminal plug having terminal elements in plug-in frictional engagement with the intermediate plug-in terminals thereof.

10. A multiple circuit connector assembly adapted for use with electrical conduit but having an overall physical size too large to be passed through said conduit, said assembly comprising:
a multiple conductor cable adapted to be passed through said conduit, said cable having a plurality of mutually insulated electrical conductors extending the length thereof;
an intermediate connector of a physical size adapted to be passed through said conduit, said intermediate connector being attached to one end of said cable and comprising
a donductor positioning member of insulative material spacing the ends of said conductors apart, the ends of said conductors being stripped of insulation and extending through and beyond said member in directions at angles to the cable length to form intermediate contacts, and
a matrix of molded material bonded to said cable and to said conductor positioning member on the side opposite said intermediate contacts in encapsulating relationship to said insulated conductors; and a terminal plug detachably connected to said intermediate connector and having a plurality of spaced-apart double-ended terminal contacts frictionally engageable at one end with said intermediate contacts and at the other end with terminal contacts of a mating plug.

References Cited by the Examiner

UNITED STATES PATENTS 2,421,155  5/1947  Miller et al. -------- 339—102
2,911,612  11/1959  Jackson et al. ------ 339—176

EDWARD C. ALLEN, *Primary Examiner.*

W. D. MILLER, *Assistant Examiner.*